Dec. 29, 1925.
L. D. JOSEPH
1,567,846
COMBINATION TRANSMISSION OR BRAKE LINING MEMBER
Filed May 15, 1925    2 Sheets-Sheet 1
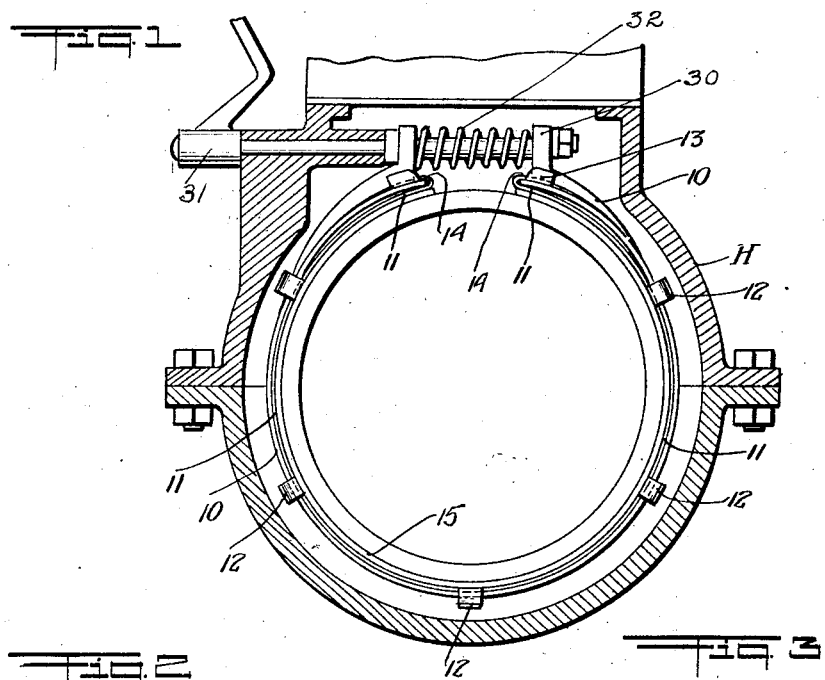
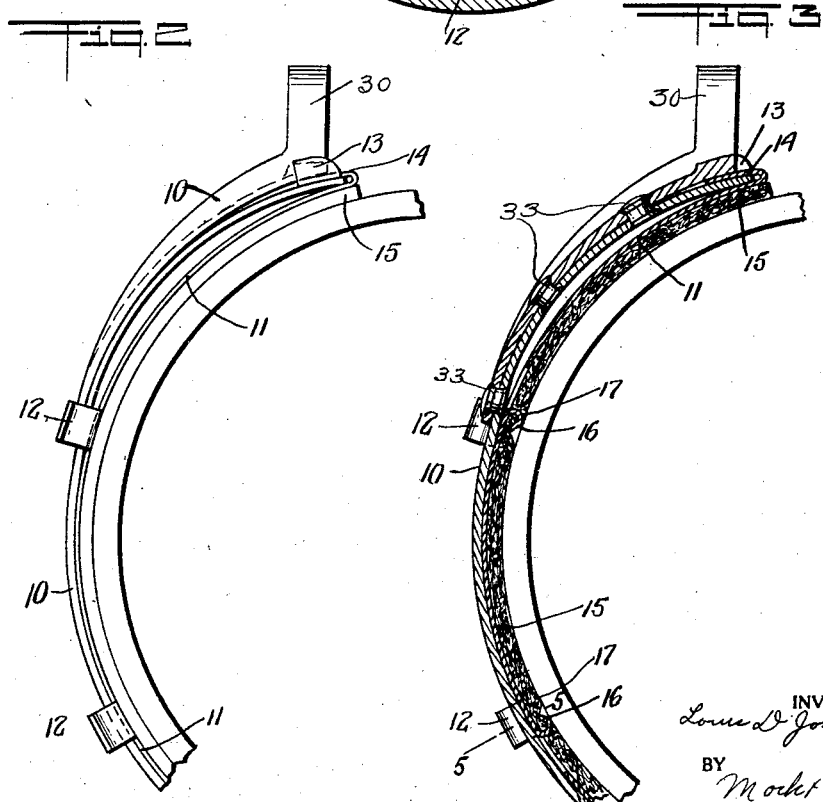
INVENTOR
Louis D. Joseph
BY
Mocher Blum
ATTORNEYS

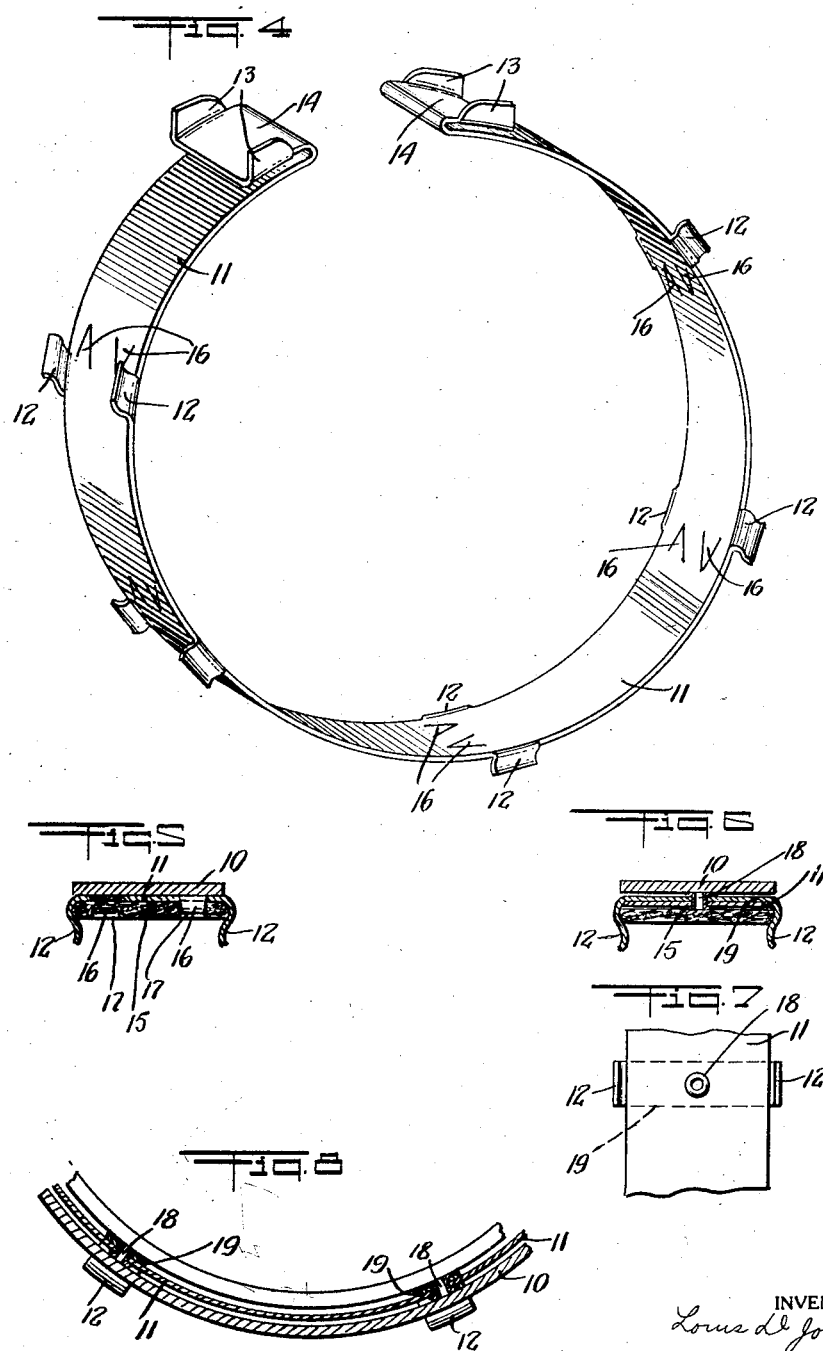

Patented Dec. 29, 1925.

1,567,846

UNITED STATES PATENT OFFICE.

LOUIS D. JOSEPH, OF NEW YORK, N. Y.

COMBINATION TRANSMISSION OR BRAKE-LINING MEMBER.

Application filed May 15, 1925. Serial No. 30,421.

*To all whom it may concern:*

Be it known that I, LOUIS D. JOSEPH, a citizen of the United States, residing at New York city, in the county of Bronx and State of New York, have invented certain new and useful Improvements in Combination Transmission or Brake-Lining Members, of which the following is a specification.

My invention relates to a new and improved combination transmission or brake band and support therefor.

One of the objects of my invention is to provide a brake band suitably connected to a support made of resilient metal, so as to form a combination brake band member which can be readily applied to and be readily removed from the brake of an automobile.

Another object of my invention is to provide a combination member of this character which shall be especially adapted for use in "Ford" automobiles.

Another object of my invention is to provide a combination member of this character which can be readily inserted into and removed from the brake of a "Ford" automobile without the necessity of opening the housing or crank-case.

Another object of my invention is to provide a combination member of this character which will be especially adapted for "Ford" automobiles and which will lessen the rattling of the brake band.

Another object of my invention is to provide a combination member of this character in which the brake lining shall be so connected to its resilient metal support that there will be no danger of injuring the brake drum.

Other objects of my invention will be set forth in the following description and drawings which illustrate a preferred embodiment thereof, it being understood that the above general statement of the objects of my invention is intended to generally expand illustrates the same part shown in Fig. 2.

Fig. 1 is a central section partially in elevation.

Fig. 2 is a detail elevation.

Fig. 3 is a detail view partially in section and illustrates the same part shown in Fig. 2.

Fig. 4 is a perspective view of the brake lining support.

Fig. 5 is a detail sectional view showing one means of securing the brake lining to the support therefor.

Fig. 6 is a view similar to Fig. 5 and shows another means for connecting the brake lining to its support.

Fig. 7 is an elevation illustrating the parts shown in Fig. 6.

Fig. 8 is a detail sectional view showing the parts illustrated in Fig. 6.

The parts are shown in connection with the ordinary transmission housing H of a "Ford" automobile which is provided with the usual cover plate. A band 10 of the usual type is provided and this has at the ends thereof the usual forked lugs 30, these lugs being engaged by the ordinary actuating means indicated generally by 31, a spring 32 of the well known type being provided between the lugs 30. These parts in themselves are old and well known and require no special description.

In the ordinary "Ford" brake, the lining is directly connected to the brake band 10 by means of rivets. Hence, whenever it is necessary to replace the bands in the ordinary "Ford" automobile, it is necessary to open the transmission housing which forms part of the crank-case, so that the operation is expensive and takes up a good deal of time.

It has also been proposed to connect the brake lining to a metal band which could be connected to the brake band of the automobile, but devices of this character have been subject to many defects which it is the object of my invention to obviate.

As shown in Fig. 4, the resilient supporting member 11, which is made of any suitable resilient metal, is provided with a plurality of inwardly curved holding lugs 12 also made of springy metal. The ends of the supporting member 11 are rearwardly curved so as to form end hooks provided with upstanding guide lugs 13.

As shown for example in Fig. 3, the end lugs 30 of the brake band 10 are parts of short castings which are connected to the brake band 10 by means of rivets 33 and the said castings are spaced from the ends of the brake band 10 which are directly adjacent the lugs 30, so that the end hooks 14 of the supporting member 11 can pass between the lugs 30 and the adjacent ends of the brake band 10.

In order to connect the resilient supporting member 11 to the brake band 10, it is merely necessary to pass one end of the supporting member 11 into the housing so that the brake lining 15 is at the bottom, and the end lugs 13 slide upon the sides of the brake band 10. The lugs 12 also slide at the sides of the brake band 10 as the member 11 is pushed into the housing until the member 11 has been completely inserted and one of the hooks 14 has been caused to engage one of the ends of the brake band 10. The other hook 14 is then caused to engage the other end of the brake band 10 so that the parts now have the position shown in Fig. 1, the resilient and inwardly bent lugs or tongues 12 firmly but detachably engaging the edges of of the brake band 10. As shown more particularly in Fig. 2, the outer ends of the supporting member 11 remain spaced from the outer ends of the brake band 10 while the inner portions of the brake band 10 and the supporting member 11 remain in more or less close contact with each other.

Hence, when the brake band 10 rattles because of the movement of the car, the supporting member 11 has a certain amount of play with respect to the brake band 10 so that additional rattling due to the supporting member 11 is minimized.

The inner portion of the supporting member 11 tends to remain slightly spaced from the brake band 10 save at the points adjacent the lugs 12.

In order to secure the brake lining 15 to the supporting member 11, tongues 16 may be stamped and bent out of the supporting member 11 and bent backwardly so as to pass through and firmly engage the brake lining 15. The tongues 16 extend in opposite directions so as to prevent any movement of the brake lining 15 with respect to the supporting member 11 in opposite directions, and the said tongues are bent back and forced against the body of the supporting member 11 as much as possible so that when the attachment of the brake lining 15 to the supporting member 11 has been completed, the said tongues 16 are located in openings 17 of the brake lining 15.

Instead of using these tongues, eyelets 18 may be employed and these eyelets are also forced into recesses in the brake lining 15 so as to prevent any injury to the brake drum. If such eyelets 18 are utilized, the tongues 12 may form portions of separate cross-members 19, which may be connected to the supporting member 11 by means of the said eyelets 18.

In order to remove one of the brake linings and supports according to my invention, it is only necessary to detach the hooks 14 from the ends of the brake member 10, whereupon the support 11 can be readily pulled out of the housing.

The supporting member or band 11 is preferably made of a flexible cold rolled steel.

Attention is also called to the fact that when a brake embodying my invention is utilized, that the resiliency of the supporting member 11 and the fact that the supporting band 11 is spaced from the brake band 10, causes the brake to be applied gradually so as to engage the brake drum, thereby eliminating a great deal of the chatter and jerky action of the brakes.

In order to apply my invention to a "Ford" car, it is merely necessary to remove the old lining and rivets.

I have described a preferred embodiment of my invention, but it is clear that numerous changes and omissions could be made without departing from its spirit.

Since the lugs 12 are made of springy metal as before described, when it is attempted to pull the member out of the housing H, then the lugs 12 are easily pulled out of engagement with the member 10. On the contrary, if these lugs 12 were made of rigid metal, it would be necessary to slide them one by one to the top of the housing before they could be detached from the member 10, and this would make the operation much more difficult.

While the claims herein specify a brake member, it is well known that in the planetary type of transmission that the transmission members are also in effect brake members, and my invention is broad enough to cover the application thereof to transmission members and other purposes.

I claim:—

1. In a brake, an outer curved brake band having castings connected to the ends thereof, the said castings having their outer ends adjacent to and spaced from the ends of said outer brake band, and an inner brake lining member comprising an inner curved resilient band having brake lining connected to the inner face thereof, the inner bands having hooks at the ends thereof adapted to slidably engage the ends of the outer band, the curvature of the end portions of said inner band being less than the curvature of the corresponding end portions of the outer band, so that the said end portions of the respective bands are spaced from each other when the brake is inoperative.

2. An inner brake member comprising a curved resilient band having brake lining connected to the inner face thereof, said band having hooks at the ends thereof, and also having spring lugs intermediate the ends thereof, said lugs having portions thereof extending towards the central line of band and over the lateral periphery thereof.

In testimony whereof I affix my signature.

LOUIS D. JOSEPH.